(12) United States Patent
Kang et al.

(10) Patent No.: US 9,061,941 B2
(45) Date of Patent: Jun. 23, 2015

(54) FUNCTIONAL INORGANIC BOARD AND MANUFACTURING METHOD THEREOF

(75) Inventors: Gilho Kang, Daejeon (KR); Seongchan Park, Cheongju-si (KR); Sung Seock Hwang, Cheongju-si (KR); Jong-won Chung, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 425 days.

(21) Appl. No.: 13/387,510

(22) PCT Filed: Aug. 24, 2010

(86) PCT No.: PCT/KR2010/005620
§ 371 (c)(1),
(2), (4) Date: Jan. 27, 2012

(87) PCT Pub. No.: WO2011/034292
PCT Pub. Date: Mar. 24, 2011

(65) Prior Publication Data
US 2012/0128950 A1    May 24, 2012

(30) Foreign Application Priority Data

Sep. 21, 2009  (KR) .................. 10-2009-0089274

(51) Int. Cl.
| | | |
|---|---|---|
| *B32B 3/10* | (2006.01) | |
| *B32B 27/06* | (2006.01) | |
| *B32B 29/00* | (2006.01) | |
| *C08K 3/16* | (2006.01) | |
| *B29C 67/24* | (2006.01) | |
| *B29C 39/00* | (2006.01) | |

(Continued)

(52) U.S. Cl.
CPC .......... *C04B 28/30* (2013.01); *Y10T 428/24934* (2015.01); *Y10T 428/24926* (2015.01); *Y10T 428/24802* (2015.01); *C04B 20/1029* (2013.01); *C04B 28/105* (2013.01)

(58) Field of Classification Search
None
See application file for complete search history.

(56) References Cited

U.S. PATENT DOCUMENTS 4,747,240 A * 5/1988 Voisinet et al. .............. 52/173.1
5,804,297 A * 9/1998 Colvin et al. ................. 428/327
(Continued)

FOREIGN PATENT DOCUMENTS

JP        2003246977 A      9/2003
KR    10-2007-0050065 A     5/2007
(Continued)

OTHER PUBLICATIONS

Machine translation of Ishiguro et al, JP 2003-246977, May 2005.*

*Primary Examiner* — David Sample
(74) *Attorney, Agent, or Firm* — Nath, Goldberg & Meyer; Joshua B. Goldberg; Sanjana Mangalagiri (57) ABSTRACT

The present invention relates to an inorganic board comprising a base layer containing magnesium-based inorganic materials and phase change materials, and to a method for producing the board. The inorganic board of the present invention employs magnesium-based inorganic materials instead of plaster used in conventional boards, and thus improves the strength and water resistance thereof as compared to conventional plaster boards. Accordingly, the board of the present invention is formed so as to be thin, and the content of the phase change materials in the base layer increases by the superior blending ratio of magnesium-based inorganic materials and phase change materials, thus maintaining the indoor temperature of the structure constructed by the board of the present invention at a comfortable level. Therefore, the inorganic board of the present invention can be effectively used in interior materials or the like for a building, which require strength and water resistance properties.

16 Claims, 3 Drawing Sheets

(51) Int. Cl.
  *B29C 45/00*  (2006.01)
  *C08K 3/22*  (2006.01)
  *B32B 17/06*  (2006.01)
  *C04B 28/30*  (2006.01)
  *C04B 20/10*  (2006.01)
  *C04B 28/10*  (2006.01)

(56) References Cited

U.S. PATENT DOCUMENTS 7,166,355 B2 *  1/2007  Jahns et al. .............. 428/402.21

2011/0089386 A1 *  4/2011  Berry et al. .................... 252/602
2011/0089387 A1 *  4/2011  Berry et al. .................... 252/602
2011/0108758 A1 *  5/2011  Driscoll .......................... 252/79
2011/0121246 A1 *  5/2011  Biggin et al. .................. 252/601

FOREIGN PATENT DOCUMENTS

| KR | 10-2007-0062009 A | 6/2007 | |
| KR | 10-2008-0098186 A | 11/2008 | |
| KR | 10-0905402 B1 | 6/2009 | |
| WO | WO 2009059908 A2 * | 5/2009 | ............. C04B 28/32 |

* cited by examiner

FUNCTIONAL INORGANIC BOARD AND MANUFACTURING METHOD THEREOF

This is a National Phase Application filed under 35 U.S.C. §371 as a national stage of International Application No. PCT/KR2010/005620, filed Aug. 24, 2010, claiming the benefit from Korean Patent Application No. 10-2009-0089274, filed Sep. 21, 2009, the entire content of each of which is hereby incorporated by reference in its entirety.

TECHNICAL FIELD

The present invention relates to a functional inorganic board and a manufacturing method thereof.

BACKGROUND ART

Generally, interior board materials for buildings, such as plaster or ceramic boards, are manufactured by forming plaster into a board and attaching paper to opposite sides thereof to maintain a structure capable of enduring sheer strength.

Such plaster boards have excellent insulation properties and flame retardancy but are easily slackened by moisture on coupled portions, so that the structure breaks or is easily destroyed due to low strength, for example, when a nail is hammered thereto.

That is, plaster, widely used as a board material in the art, has a density of 0.7 g/cm$^3$, making it difficult to mix with other additives having a relatively high specific gravity, and can easily break due to its low strength. Thus, a board needs to be formed thick to have a predetermined thickness or more.

As described above, due to vulnerability to moisture and low strength, conventional plaster boards are not useful for construction materials which require high strength and water resistance.

Thus, there is an increasing need for development of a board which has appropriate properties to solve low strength and water resistance of the conventional plaster board and to be used for interior building materials.

DISCLOSURE

Technical Problem

The present invention provides a functional inorganic board exhibiting excellent strength and water resistance and having heat storage performance to adjust indoor temperature, and a manufacturing method thereof.

Technical Solution

In accordance with an aspect of the present invention, an inorganic board includes a base layer containing a magnesium-based inorganic material and a phase change material.

In accordance with another aspect of the present invention, a method of manufacturing an inorganic board includes: mixing a magnesium-based inorganic material and a phase change material; and molding the mixture of the magnesium-based inorganic material and the phase change material.

Advantageous Effects

According to embodiments of the present invention, an inorganic board uses a magnesium-based inorganic material instead of plaster used in the art, thereby improving strength and water resistance, which are inferior in a conventional plaster board. Further, since the magnesium-based inorganic material and a phase change material have similar specific gravities, the amount of the phase change material may be increased in the inorganic board, thereby further improving latent heat storage capacity due to the phase change material.

In addition, the inorganic board according to the embodiments of the present invention has excellent strength and thus may be formed thin. Further, the inorganic board exhibits improved heat storage performance due to the phase change material to have a function of maintaining indoor temperature at a proper temperature, and thus is useful for interior building materials.

MODE FOR INVENTION

The present invention relates to an inorganic board which includes a base layer containing a magnesium-based inorganic material and a phase change material.

Next, the inorganic board according to the present invention will be described in detail.

As described above, the inorganic board according to the present invention includes the base layer containing a magnesium-based inorganic material and the phase change material.

As used herein, the term "magnesium-based inorganic material" refers to an inorganic material that contains magnesium. Such magnesium-based inorganic materials exhibit high strength and excellent water resistance and thus may be more usefully applied to interior building materials or the like which require strength and water resistance.

The magnesium-based inorganic material contains magnesium to exhibit excellent strength and water resistance and may include any material known in the art. Examples of the magnesium-based inorganic material may include, without being limited to, magnesium oxide, magnesium chloride and mixtures thereof. Specifically, a mixture of magnesium oxide and magnesium chloride may be used as the magnesium-based inorganic material.

In addition, the magnesium-based inorganic material may be present in an amount of, for example, 40 to 90 parts by volume based on 100 parts by weight of the base layer, without being limited thereto. If the amount of the magnesium-based inorganic material is less than 40 parts by volume, there is a possibility of reduction in strength and water resistance. If the amount of the magnesium-based inorganic material exceeds 90 parts by volume, the amount of the phase change material is relatively reduced, thereby deteriorating a function of latent heat storage.

Furthermore, the magnesium-based inorganic material may further include additives such as wood powder, expanded perlite, foaming agents, curing adjustors and the like to enhance physical properties such as strength.

That is, the additives may optionally be present in an amount of, for example, 15 parts by weight based on 100 parts by weight of the magnesium-based inorganic materials so as not to affect the function of the magnesium-based inorganic material, without being limited thereto.

As used herein, the term "phase change material (PCM)" refers to a material capable of storing energy or maintaining a constant temperature through absorption and emission of latent heat. Such materials may include both organic phase change materials and inorganic phase change materials, and are not limited to a specific kind of material. For example, the phase change material may be paraffin. More specifically, the phase change material may be paraffin represented by Chemical Formula 1:

$$C_nH_{2n+2},$$

In this formula, n represents an integer in the range of 10 to 30.

Further, when the phase change material according to this invention is paraffin represented by Chemical Formula 1, n may be an integer in the range of 14 to 24, specifically, in the range of 16 to 18.

More specifically, the phase change material may include at least one selected from the group consisting of, for example, tetradecane, pentadecane, hexadecane, heptadecane, octadecane, nonadecane, icosane, heneicosane, docosane, tricosane and tetracosane.

Furthermore, the phase change material may be micro-encapsulated with a polymer material.

As used herein, the term "micro-encapsulated" refers to a state wherein a specific material encloses an outer surface of another material acting as a core to form a core-shell structure capsule having a micrometer scale. Thus, in this invention, as the outer surface of the phase change material is encapsulated with the polymer material as described above, the term "micro-encapsulated material" means a micro-encapsulated phase change material (MePCM) having a micrometer scale.

The polymer material is not specifically limited and may include any polymer material so long as the polymer material may form a shell capable of protecting and holding the phase change material by surrounding the outer surface thereof. For example, the polymer material may include at least one selected from the group consisting of melamine formaldehyde resins, polymethyl(meth)acrylate, polyoxy methylene urea resins, Teflon, Nylon, and gelatin.

As such, when the phase change material micro-encapsulated with the polymer material is used, there is an advantage in that the phase change material can be securely fixed and protected.

The phase change material may be composed of 90% of phase change material particles having a particle size of, for example, 1 to 100 μm, without being limited thereto. Specifically, the phase change material may have an average particle size of 1 to 100 μm, and more specifically 2 to 50 μm.

If the average particle size of the phase change material is less than 1 μm, the amount of the phase change material significantly increases to exhibit effects of latent heat storage due to such an excessively fine particle size, thereby causing a significant increase in manufacturing costs. If the average particle size exceeds 100 μm, there is a possibility of physical collision between the phase change material particles, causing failure of the phase change material.

Further, the phase change material may have, without being limited to, a latent heat storage capacity of, for example, 50 to 500 kJ/kg, specifically 50 to 200 kJ/kg, to provide more effective heat storage performance.

If the phase change material has a latent heat storage capacity less than 50 kJ/kg, the effects of latent heat storage can be insignificant. On the other hand, it is be difficult to realize such a phase change material having a latent heat storage capacity exceeding 500 kJ/kg.

Further, the phase change material may have a phase change temperature of, for example, room temperature or less, specifically 10° C. to 40° C., without being limited thereto.

If the phase change temperature of the phase change material is room temperature or less, it is difficult to realize the effects of latent heat storage resulting from phase change at room temperature or less, and the effects of latent heat storage can be realized under specific temperature conditions, thereby significantly deteriorating efficiency.

On the other hand, according to the present invention, the magnesium-based inorganic material may have a similar density to that of the phase change material. For example, the magnesium-based inorganic material and the phase change material may have a density in the range of about 0.8 to 1.0 g/cm³, without being limited thereto. Specifically, the magnesium-based inorganic material and the phase change material may have a density of about 0.9 g/cm³. Since the magnesium-based inorganic material and the phase change material contained in the base layer have a similar density as described above, they may be easily mixed with each other due to excellent compatibility therebetween.

Accordingly, the phase change material may be present in a higher amount in the base layer, whereby the inorganic board may have significantly improved heat storage effects based on the latent heat storage function of the phase change material.

Further, the phase change material may be present in an amount of, for example, 10 to 60 parts by volume based on 100 parts by volume of the base layer, but is not limited thereto. Specifically, the phase change material may be present in an amount of 20 to 60 parts by volume, more specifically 30 to 60 parts by volume.

If the amount of the phase change material is less than 10 parts by volume based on 100 parts by volume of the base layer, the phase change material occupies a small volume in the base layer, thereby causing insignificant heat storage effects. If the amount of phase change material exceeds 60 parts by volume, it can be difficult to form an inorganic board and there is a possibility of reduction in strength and durability of the board due to a reduction in coupling force of a matrix.

The base layer may further include a reinforcing fiber in addition to the magnesium-based inorganic material and the phase change material. Addition of the reinforcing fiber may additionally improve physical properties of the inorganic board, such as toughness, bending capability, flexibility, flexural strength, and the like.

Examples of the reinforcing fiber may include organic or inorganic fibers such as pulp fiber, vinylon fiber, acryl fiber, polypropylene fiber, glass fiber, rock wool, sepiolite, mineral fiber, etc., without being limited thereto. Any reinforcing fiber known in the art may be used so as not to affect strength, water resistance and latent heat storage effects of the inorganic board according to the present invention. The amount of the reinforcing fiber is not specifically limited and may be properly determined as needed.

According to the present invention, the inorganic board may have a heat storage capacity of, for example, 50 to 500 kJ/m$^2$, without being limited thereto. Accordingly, the inorganic board according to this invention may have an excellent latent heat storage function as well as excellent strength and water resistance.

As used herein, the term "heat storage capacity" refers to latent heat storage capacity per unit area of the inorganic board as determined depending on the amount of the phase change material in the inorganic board and the thickness of the inorganic board.

The inorganic board according to the present invention has excellent properties in terms of strength, water resistance and latent heat storage effects and thus may be usefully applied to interior building materials for controlling interior temperature of a building.

The thickness of the inorganic board may be suitably determined according to use of the inorganic board and may be, for example, 3 to 20 mm, without being limited thereto.

The inorganic board according to the present invention may further include a surface layer formed on one or both sides of the base layer and comprising at least one selected from the group consisting of pulp fiber, glass fiber, cellulose, and polyester fiber.

The surface layer may be composed of woven fabrics, non-woven fabrics and combinations thereof. Specifically, the surface layer may be composed of non-woven fabrics of the aforementioned fiber, in which the non-woven fabrics may be functional non-woven fabrics subjected to antibacterial or antimycotic treatment by a method known in the art.

In this invention, the surface layer is formed on one or both sides of the base layer as described above, thereby reducing size change even in the case where the inorganic board is exposed to moisture. Accordingly, the inorganic board may have improved water-proofing properties. Interior building materials made of the inorganic board according to the present invention exhibit improved coupling performance with respect to other interior materials while ensuring excellent strength and decorative effects.

Furthermore, the inorganic board according to the present invention may further include a glass fiber reinforcing layer, which includes glass fiber meshes, between the base layer and the surface layer to increase strength.

With the glass fiber-reinforced layer as described above, the inorganic board may have further improved strength in addition to improvement in strength by the surface layer.

On the other hand, the inorganic board according to the present invention may further include a printed layer on the surface layer to provide a more pleasing appearance. Specifically, in the inorganic board according to the present invention, a desired pattern may be precisely printed on the surface layer by any printing method known in the art (for example, transfer printing, gravure printing, and the like), thereby realizing a more impressive and luxurious appearance.

Hereinafter, inorganic boards according to embodiments of the present invention will be described with reference to FIGS. 1 and 2.

Figure 1:
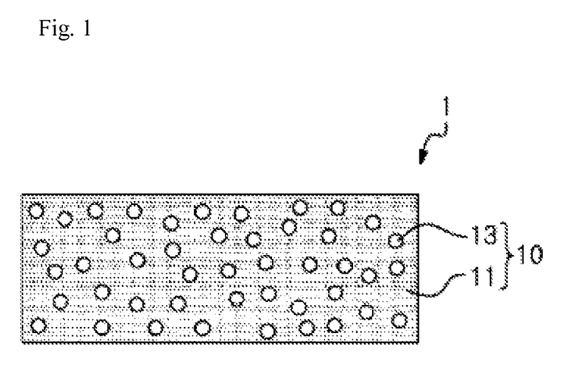
FIG. 1 is a schematic view of an inorganic board according to an embodiment of the present invention.
Figure 2:
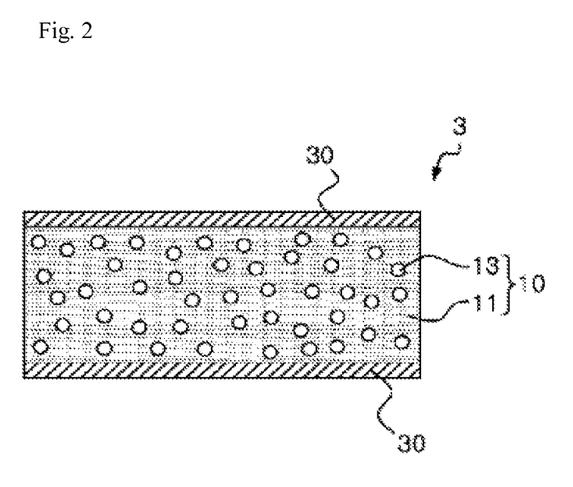
FIG. 2 is a schematic view of an inorganic board according to another embodiment of the present invention.

Referring to FIG. 1, an inorganic board 1 according to one embodiment of the invention may include a base layer 10 containing a mixture of a magnesium-based inorganic material 11 and a phase change material 13.

That is, the inorganic board 1 according to the present embodiment includes the base layer 10 formed by mixing the magnesium-based inorganic material 11, which exhibits high strength and excellent water resistance, with the phase change material 13, which provides heat storage effects, and molding the mixture of the magnesium-based inorganic material and the phase change material, thereby obtaining excellent water resistance while providing a function of adjusting indoor temperature through latent heat storage performance.

Further, an inorganic board 3 according to another embodiment of the present invention includes a base layer 10 having excellent water resistance and heat storage performance, as described above, and surface layers 30 composed of any one of woven fabrics, non-woven fabrics and combinations thereof and formed on opposite sides of the base layer 10, thereby having excellent waterproof performance.

The inorganic board according to the present invention, which is a construction material, is installed on a ceiling, a wall, a floor, etc. When indoor temperature increases, the inorganic board absorbs heat to stay cool. Also, when the indoor temperature decreases, the inorganic board emits stored heat to maintain a proper temperature. In particular, the inorganic board may be usefully applied as an interior building material which adjusts temperature to maintain a suitable indoor temperature and requires strength and water resistance.

In addition, the present invention relates to a manufacturing method of an inorganic board which includes mixing a magnesium-based inorganic material and a phase change material; and molding the mixture of the magnesium-based inorganic material and the phase change material.

In this method, first, the magnesium-based inorganic material and the phase change material are mixed to prepare a mixture of the magnesium-based inorganic material and the phase change material.

When mixing the magnesium-based inorganic material and the phase change material, the magnesium-based inorganic material may be previously mixed with a solvent such as water to be smoothly mixed with the phase change material.

For example, when the magnesium-based inorganic material contains magnesium oxide, magnesium chloride and water, the amount of each component contained in the magnesium-based inorganic material is not particularly limited. For example, the magnesium-based inorganic material may include 30 to 50 parts by weight of magnesium oxide, 20 to 35 parts by weight of magnesium chloride, and 15 to 30 parts by weight of water.

If the amount of each component included in the magnesium-based inorganic material is not within the range described above, the magnesium-based inorganic material does not have proper viscosity and can generate unreacted materials in a curing reaction of the inorganic material in the subsequent molding process. Thus, a manufactured board may have reduced strength and durability.

However, it should be understood that the amount of each component included in the magnesium-based inorganic material is not limited to the above range. The respective components may be mixed according to various compositions so long as desired strength and water resistance of the inorganic board are not affected.

In the mixing the magnesium-based inorganic material and the phase change material, the phase change material is not limited to a particular form. For example, the phase change material may be any one type selected from a powdery form, a granular form, and a slurry form and may have a different solid content depending on the form of the phase change material.

The term "solid content" refers to a solidified part which does not contain water, when defining a pure phase change material containing no water as having a solid content of 100 wt %. Although the solid content is not particularly limited depending on each form, for example, a powdery form may have a solid content of 95 wt % or more. A granular form may have a solid content of 60 to 80 wt %, and a slurry form may have a solid content of 30 to 55 wt %, without being limited thereto.

For example, the phase change material may be micro-encapsulated in water by crosslinking reaction of a polymer, and thus the micro-encapsulated phase change material may have a slurry form. Further, the phase change material in slurry form may be formed into a phase change material in granular form or powdery form via washing and drying.

Specifically, a phase change material in slurry form may be used since it is inexpensive and can be easily mixed with the magnesium-based inorganic material.

Then, the mixture is molded into an inorganic board.

As described above, the mixture is prepared and molded to manufacture an inorganic board. Here, a molding method may include any method used in the art to mold a board. For example, press molding, extrusion molding, injection molding, slip casting, and tape casting may be used, without being limited thereto. Specifically, press molding using a press roller may be used.

Specifically, the prepared mixture is applied to a flat substrate and press-molded using a pressing roller, followed by drying and curing, thereby manufacturing an inorganic board.

Further, the manufacturing method according to the present invention may further include depositing at least one layer selected from a surface layer, a printed layer, and a glass fiber reinforcing layer, as described above. Accordingly, the inorganic board may be manufactured with higher strength and water resistance and decorative effects.

Figure 3:
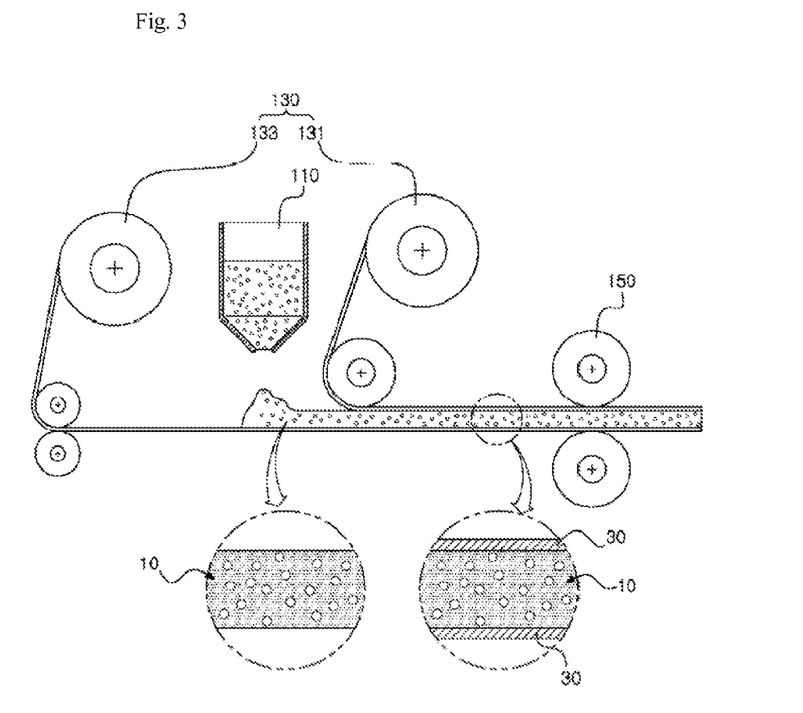
FIG. 3 is a schematic process view illustrating a manufacturing method of the inorganic board according to the other embodiment of the present invention.

Next, the method of manufacturing an inorganic board according to the present invention will be described in more detail with reference to FIG. 3. Referring to FIG. 3, the mixture of the magnesium-based inorganic material and the phase change material may be applied as a base layer material to a flat substrate from a base layer material supplier 110.

Then, while moving the mixture applied to the flat substrate, non-woven fabric is deposited on opposite sides of the mixture using a surface layer material supply roller 130 including an upper roller 131 and a lower roller 133 and is press-molded using a pressing roller 150, thereby manufacturing an inorganic board including the base layer 10 and the surface layers 30 formed on opposite sides of the base layer 10.

The method according to the present invention may further include a moist curing process to prevent the inorganic board from cracking due to excessive curing and to discharge harmful substances after molding the mixture. When manufacturing the inorganic board, a suitable process known in the art such as a continuous process or batch process may be employed in consideration of applications and efficiency.

EXAMPLES

Hereinafter, the present invention will be explained in more detail with reference to the following examples and comparative examples. These examples are provided for illustrative purposes only and are not to be in any way construed as limiting the present invention.

Preparation Example 1

A small amount of a commonly used foaming agent and phosphoric acid was added to a mixture of 24 kg of magnesium oxide, 12 kg of magnesium chloride, 6 kg of water, and 2.5 kg of expanded perlite to have a density to 0.9 g/cm$^3$ and was uniformly mixed for 20 minutes, preparing a magnesium-based inorganic material.

Example 1

The magnesium-based inorganic material prepared in Preparation Example 1 was mixed with 27 kg of a micro-encapsulated phase change material (MePCM, n-octadecane micro-encapsulated with melamine formaldehyde resin) in slurry form having a solid content of 65 wt % and was stirred for 20 minutes, thereby preparing a base layer material.

The base layer material was deposited to a thickness of 9 mm on a plastic flat substrate and was formed into a base layer using a pressing roller. Then, a first non-woven fabric composed of polyester and glass fiber was deposited on an upper side and a lower side of the base layer and was pressed using the pressing roller, thereby forming a board having a uniform thickness of 9 mm.

The first non-woven fabric has a configuration shown in Table 1.

The board was cured at 40° C. for 24 hours, dried at 50° C. for 3 days, and then cured in air for 3 days. Then, the board was cut into a 450 cm×450 cm piece, thereby manufacturing an inorganic board according to Example 1.

Figure 4:
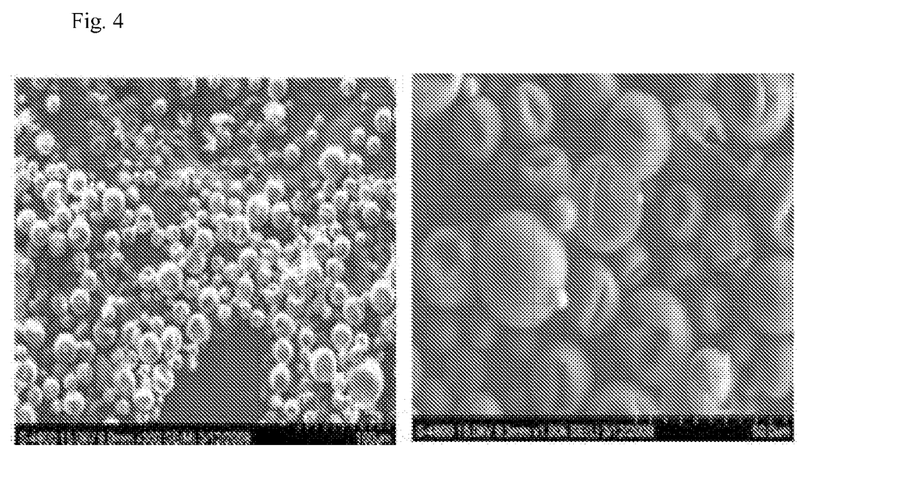
FIG. 4 shows SEM pictures of an MePCM used in Example 1.
Figure 5:
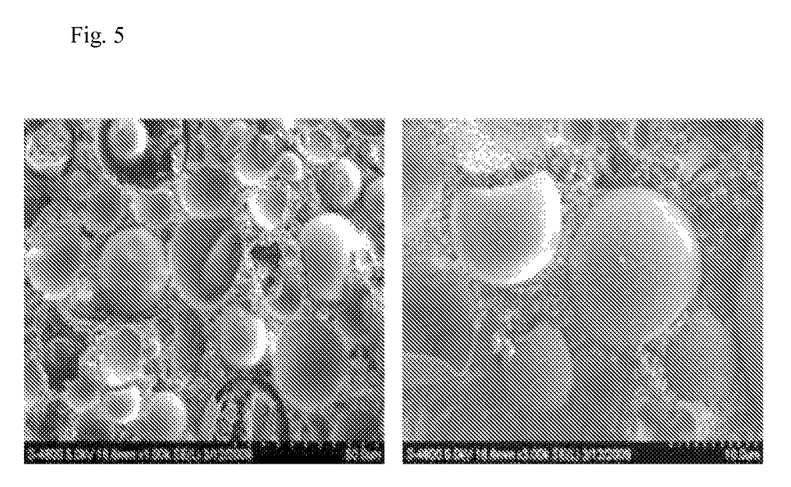
FIG. 5 shows SEM pictures of base layer materials including a mixture of MePCM used in Example 1 and a magnesium-based inorganic material.

Here, FIG. 4 shows SEM images of the MePCM, and FIG. 5 shows SEM images of a base layer material including a mixture of the MePCM and the magnesium-based inorganic material.

TABLE 1

|  | Unit | First non-woven fabric | Second non-woven fabric |
| --- | --- | --- | --- |
| Composition |  | Polyester and glass fiber | Polyester and cellulose |
| Weight | g/m$^2$ | 120 | 160 |
| Thickness | μm | 300 | 396 |
| Tensile strength (L direction) | N/M | 14,000 | 8,000 |
| Tensile strength (W direction) | N/M | 5,000 | 5,000 |
| Elongation (L direction) | % | 3 | 4 |
| Elongation (W direction) | % | 3 | 8 |

Example 2

An inorganic board according to Example 2 was manufactured in the same manner as in Example 1 except that a printed layer was further formed on the surface layer by transfer printing which used general transfer film paper and involves heat-pressing at 175° C. and 5 Torr for 5 minutes.

Example 3

An inorganic board according to Example 3 was manufactured in the same manner as in Example 1 except that the base layer material prepared in Example 1 was applied to a plastic flat substrate, and glass fiber meshes were deposited on an upper side and a lower side of the base layer to form a second non-woven fabric, listed in Table 1, using an upper supply roller and a lower supply roller.

Comparative Example 1

An inorganic board according to Comparative Example 1 was manufactured in the same manner as in Example 1 except that the magnesium-based inorganic material prepared in Preparative Example 1 was used as a base layer material.

Comparative Example 2

A board according to Comparative Example 2 was prepared by cutting a general plaster board, obtained from KCC Corporation, into a piece having the same size as in Example 1.

Test Example

1. Screw Bearing Capacity

The screw bearing capacity of each of the boards according to Examples 1 to 3 and Comparative Examples 1 and 2 was measured according to KS F 2214, and results are shown in Table 2.

2. Flexural Strength

The flexural strength and flexural strength after water storage of each of the boards according to Examples 1 to 3 and Comparative Examples 1 and 2 were measured according to KS F 2263, and results are shown in Table 2.

3. Density

The density of each of the boards according to Examples 1 to 3 and Comparative Examples 1 and 2 was measured according to KS F 2518, and results are shown in Table 2.

4. Other Functions

The boards according to Examples 1 to 3 and Comparative Examples 1 and 2 were evaluated as to latent heat storage capacity, surface printing possibility, and cuttability, and results are shown in Table 2.

(1) Latent Heat Storage Capacity

Each board was heated from 0 to 50° C. while elevating temperature at a rate of 3° C. and then heat absorption amount was measured using DSC (DSC Q10, TA instrument).

(2) Surface Printability

In order to identify whether the printed layer of Example 2 could be formed on each of the boards of Examples 1 and 3 and Comparative Examples 1 and 2, transfer printing was performed on the boards of Examples 1 and 3 and Comparative Examples 1 and 2, and results are divided into surface printable boards and surface unprintable boards.

(3) Cuttability

The boards according to Examples 1 to 3 and Comparative Examples 1 and 2 were cut once using a utility knife, and results are divided into excellent cuttability and poor cuttability depending on whether the boards were cut.

TABLE 2

|  | Example 1 | Example 2 | Example 3 | Comparative Example 1 | Comparative Example 2 | Test method |
|---|---|---|---|---|---|---|
| Thickness (mm) | 9 | 9 | 9 | 9 | 9.5 | — |
| Screw bearing capacity (kgf/cm) | 39 | 39 | 39 | 38 | 6.01 | KS F 2214 |
| Density (g/cm$^3$) | 0.9 | 0.9 | 0.9 | 0.85 | 0.7 | KS F 2518 |
| Flexural strength (kgf/mm$^2$) | 1.1 | 1.1 | 1.5 | 1.2 | 0.57 | KS F 2263 |
| Flexural strength after water storage (kgf/mm$^2$) | 0.8 | 0.8 | 1.2 | 1.0 | 0.08 |  |
| Latent heat storage capacity (kJ/m$^2$) | 340 | 340 | 340 | — | — | — |
| Surface printing | Possible | Possible | Possible | Possible | Impossible | — |
| Cuttability | Excellent | Excellent | Excellent | Excellent | Excellent | — |

As shown in Table 2, the inorganic boards of Examples 1 to 3 and Comparative Example 1 have two times higher flexural strength and five times higher screw bearing capacity than the plaster board of Comparative Example 2, and undergo insignificant decrease in flexural strength after water storage.

Further, the inorganic boards containing the MePCM according to Examples 1 to 3 have excellent strength and water resistance and a latent heat storage capacity of about 340 kJ/m$^2$, whereas the inorganic boards of Comparative Examples 1 and 2 do not provide latent heat storage effects. The inorganic board of Comparative Example 2 has considerably low strength and screw bearing capacity as compared with the other samples.

The invention claimed is:

1. An inorganic board comprising:
a base layer containing a magnesium-based inorganic material and a phase change material, a density of the magnesium-based inorganic material and a density of the phase change material are about the same, with the densities of the magnesium-based inorganic material and the phase change material being 0.8-1.0 g/cm$^3$;
a surface layer formed on one or both sides of the base layer and comprising at least one selected from the group consisting of paper, glass fiber, cellulose, and polyester fiber; and
a glass fiber reinforcing layer between the base layer and the surface layer,
wherein the magnesium-based inorganic material comprise mixtures of magnesium oxide and magnesium chloride.

2. The inorganic board of claim 1, wherein the phase change material comprises paraffin represented by Chemical Formula 1:

$C_nH_{2n+2}$, where n represents an integer in the range of 10 to 30.

3. The inorganic board of claim 1, wherein the phase change material comprises at least one selected from the group consisting of tetradecane, pentadecane, hexadecane, heptadecane, octadecane, nonadecane, icosane, heneicosane, docosane, tricosane, and tetracosane.

4. The inorganic board of claim 1, wherein the phase change material is micro-encapsulated with a polymer material.

5. The inorganic board of claim 4, wherein the polymer material comprises at least one selected from the group consisting of melamine formaldehyde resins, polymethyl(meth) acrylate, polyoxy methylene urea resins, Teflon, Nylon, and gelatin.

6. The inorganic board of claim 1, wherein the phase change material has an average particle size of 1 to 100 μm.

7. The inorganic board of claim 1, wherein the phase change material has a latent heat storage capacity of 50 to 500 kJ/kg.

8. The inorganic board of claim 1, wherein the phase change material has a phase change temperature of 10 to 40° C.

9. The inorganic board of claim 1, wherein the phase change material is present in an amount of 10 to 60 parts by volume based on 100 parts by volume of the base layer.

10. The inorganic board of claim 1, wherein the inorganic board has a heat storage capacity of 50 to 500 kJ/m$^2$.

11. The inorganic board of claim 1, further comprising: a printed layer formed on the surface layer.

12. A method of preparing the inorganic board of claim 1 comprising:
mixing a magnesium-based inorganic material and a phase change material; and
molding the mixture of the magnesium-based inorganic material and the phase change material.

13. The method of claim 12, wherein the magnesium-based inorganic material comprises 30 to 50 parts by weight of magnesium oxide, 20 to 35 parts by weight of magnesium chloride, and 15 to 30 parts by weight of water.

14. The method of claim 12, wherein the phase change material comprises a phase change material in powdery form, a phase change material in granular form, and a phase change material in slurry form.

15. The method of claim 12, wherein the molding is performed using any one selected from the group consisting of press molding, extrusion molding, injection molding, slip casting, and tape casting.

16. An inorganic board comprising:
a base layer containing a magnesium-based inorganic material and a phase change material, a density of the magnesium-based inorganic material and a density of the phase change material are about the same, with the densities of the magnesium-based inorganic material and the phase change material being 0.8-1.0 g/cm$^3$;
a surface layer formed on both sides of the base layer and comprising at least one selected from the group consisting of glass fiber, cellulose, and polyester fiber; and
a glass fiber reinforcing layer between the base layer and the surface layer,
wherein the magnesium-based inorganic material having mixtures of magnesium oxide and magnesium chloride.

* * * * *